Patented July 23, 1929.

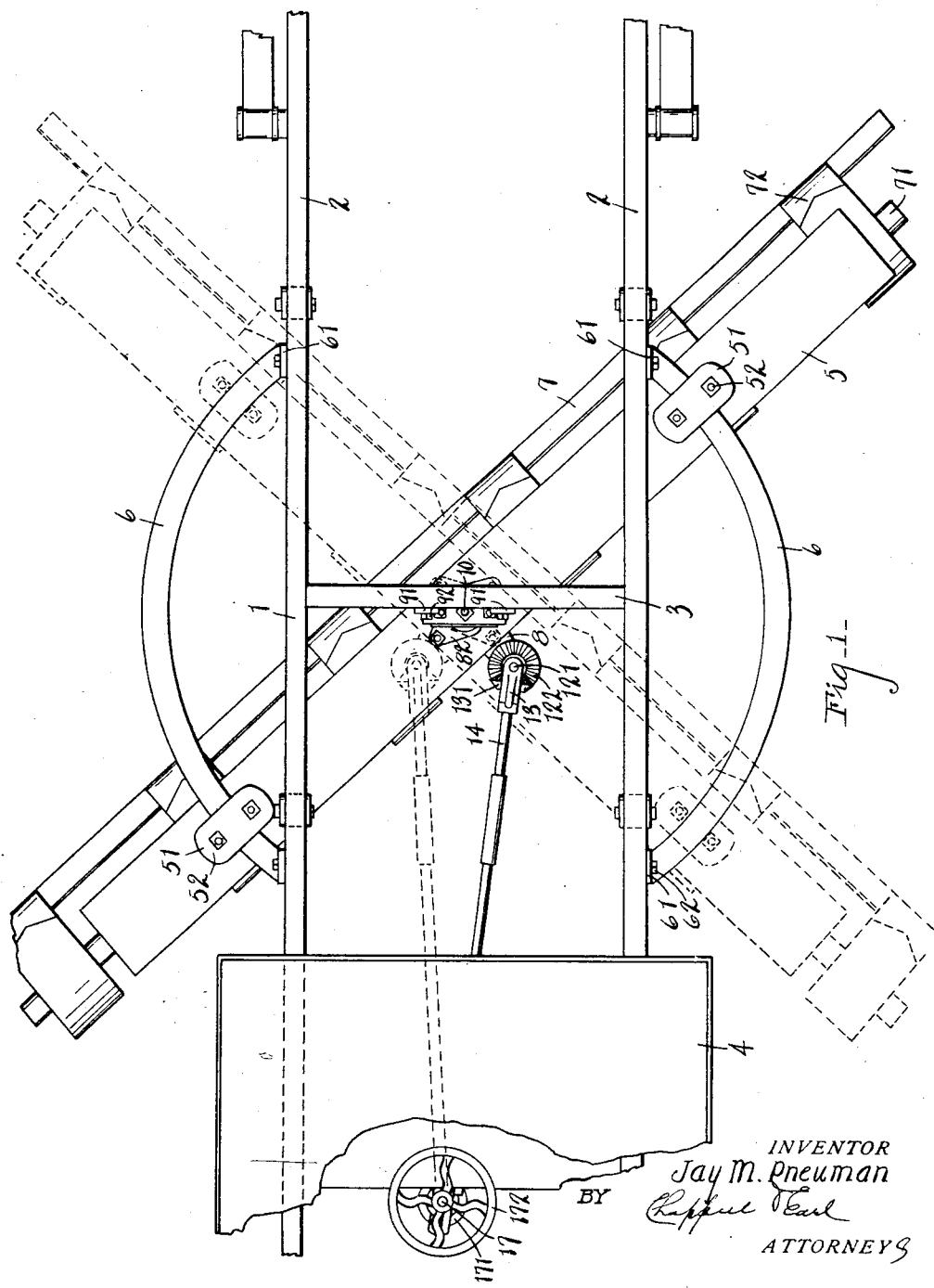

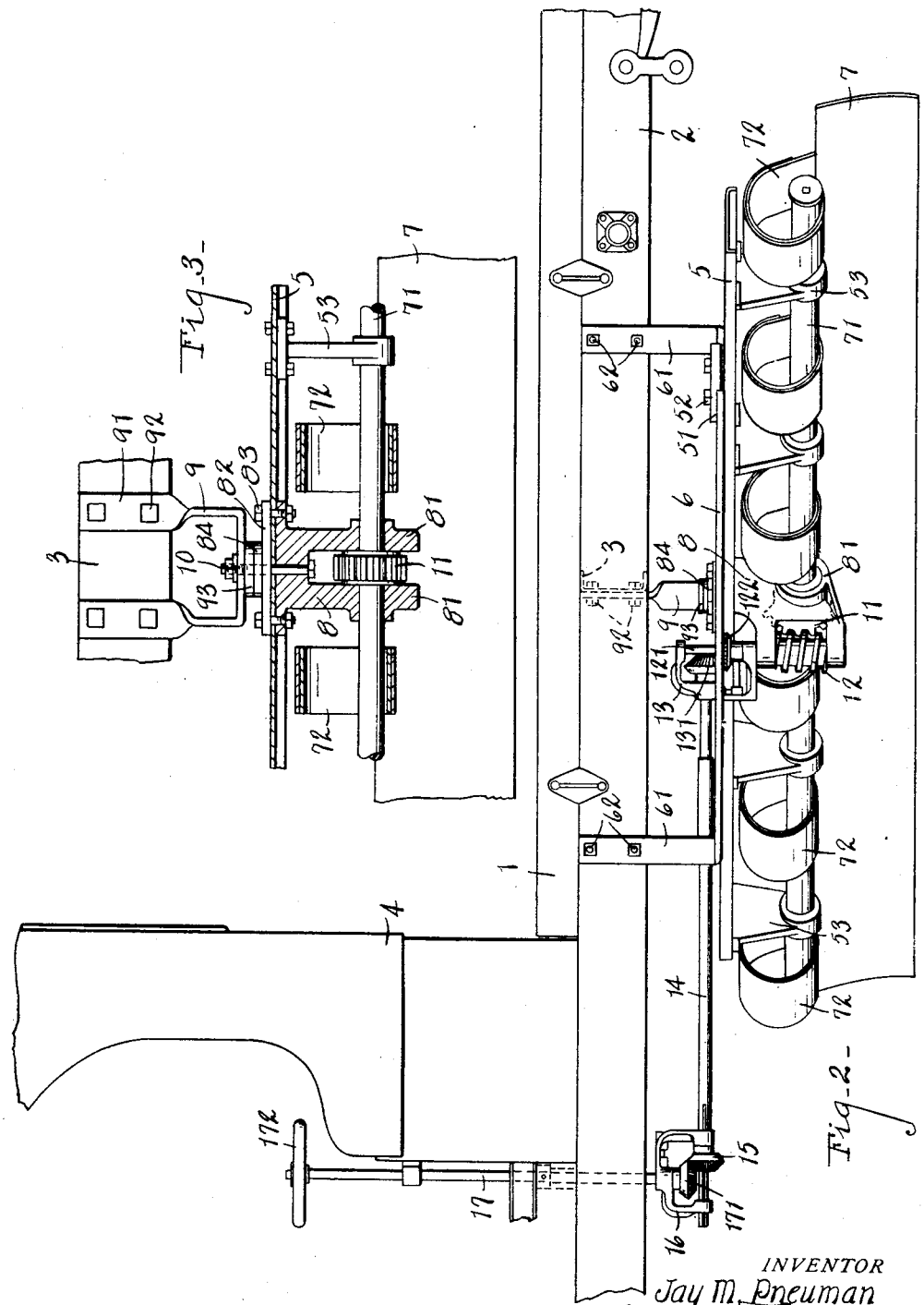

1,721,711

UNITED STATES PATENT OFFICE.

JAY M. PNEUMAN, OF KALAMAZOO, MICHIGAN, ASSIGNOR TO ROOT SPRING SCRAPER COMPANY, OF KALAMAZOO, MICHIGAN.

ROAD SCRAPER.

Application filed May 17, 1926. Serial No. 109,612.

The objects of the invention are:

First, to provide a road scraper well adapted for use as an attachment to a truck.

Second, to provide an improved adjusting means for the blade of a road scraper to different angles to its direction of travel.

Third, to provide an improved worm and gear adjusting means for the blade of a road scraper to its work.

Objects relating to details and economies of construction and operation of my invention will definitely appear from the detailed description to follow.

The invention is clearly defined and pointed out in the claims.

A structure which is a preferred embodiment of my invention is illustrated in the accompanying drawing, forming a part of this application, in which:

Fig. 1 is a plan view of parts of the chassis of a truck, all the parts except the cab being omitted, with one of my improved road scrapers in position.

Fig. 2 is a side elevation of the structure appearing in Fig. 1.

Fig. 3 is an enlarged detail transverse sectional view of the central adjusting or king bolt pivot structure, the supporting bracket being shown in full lines, the parts being illustrated as though the scraper were set to the right angled position.

The parts will be identified by their numerals of reference which are the same in all views.

The accompanying drawing shows parts of a truck with my improved road scraper in place to illustrate its operation, the wheels and driving means for the truck being omitted, and only portions of the truck frame and body being illustrated.

1 is the chassis or body of a truck. 2, 2 are the side rails thereof and 3 is the central cross beam or bar. 4 is the cab. 5 is the main beam of the scraper frame for carrying the scraper. 6, 6 are segment bars secured to the opposite side of the truck frame 2, 2 by hangers 61 which are bolted by bolts 62, 62 to the said side rails or beams of the truck.

The beam 5 of the scraper is adjustably secured to each of these segments by a clamp piece 51 held thereto by clamp bolts 52, 52. The scraper 7 is secured to the rockshaft 71 by the spring arms 72, 72 and the rockshaft is carried by and turns in hanger brackets 53 on the under side of the said beam 5.

The central turn-table bracket 8 is provided with side pieces 81, 81 in which the rockshaft 71 also turns. This bracket 8 is retained in place by clamp 82 through which extend bolts 83. The disk 84 is provided as a turn table.

A supporting bracket 9 is secured by hangers 91 to the cross beam 3 by bolts 92. A turn-table disk 93 is on the under side of the bracket 9 corresponding to the turn-table 84. A king bolt 10 is disposed through the center of the bracket on which the scraper frame is adjusted to various angles with the truck body, the extremes of position being indicated in Fig. 1. The scraper could, of course, be set at right angles.

A segment worm 11 is secured to the shaft 71 and disposed between the sides 81 of the bracket 8 for rocking the same. It is actuated by the worm 12 carried on shaft 121 which is provided with pinion 122. A bracket 13 embraces the same and provides a support for the beveled gear 131. 14 is the shaft for driving the said gear 131. The shaft key is slotted at its forward end and is adjustable through and carries a driven pinion 15 at that end. The shaft is adjustable longitudinally in driven pinion 15 and revolves in a suitable bearing in the connecting bracket 16 which is journaled on the column 17.

17 is the control column carrying the beveled pinion 171 at the bottom and the hand wheel 172 at the top, the hand wheel being mounted in fixed journal bearings carried by the cab 4.

From this description it will be seen that the scraper can be adjusted to any angle by releasing the clamps 51 and swinging the same on the central king bolt pivot 10. When it is adjusted the clamps are tightened for use. When this structure swings, it swings the bracket 8 and its pivot and the support for the shaft 121. This is accommodated by the shaft 14 sliding through its bearings in the bracket 16 and being key slotted into the driven pinion 15.

The angle of the scraper to the vertical is adjusted by the worm 12 acting upon the worm gear segment 11 which, of course, is actuated from the hand wheel 172 which turns the control column 17.

I have provided an improved means for adjusting the angle of the scraper which is especially adapted as an attachment to a truck body. It is also clear that I provide an effective means for operating the worm for adjusting the engaging angle of the scraper.

I desire to claim the invention broadly and also specifically and as an attachment as appears in the appended claims.

Having thus described my invention, what I claim as new and desire to secure by Letters Patent, is:

1. In a structure of the class described, the combination of an adjustable scraper with beam support, a rockshaft carried by said beam, a scraper supported by said rockshaft, a central pivoted bracket carrying a suitable worm gear segment connected to said rockshaft and embraced by said bracket, a worm for actuating the said gear segment carried by the said pivoted bracket, and beveled gear connections and shaft with a sliding joint leading to a suitable hand wheel in the cab of said vehicle whereby the different angular positions of the said scraper are accommodated by the said scraper adjusting means, as specified.

2. In a structure of the class described, the combination of an adjustable scraper with beam support, a rockshaft carried by said beam, a scraper supported by said rockshaft, a central pivoted bracket carrying a suitable worm gear segment connected to said rockshaft and embraced by said bracket, a worm for actuating the said gear segment carried by the said pivoted bracket, a hand wheel and shaft in the cab of said vehicle, and flexible connections therefrom to drive the said worm, as specified.

In witness whereof I have hereunto set my hand.

JAY M. PNEUMAN.